(12) United States Patent
Srikanteswara et al.

(10) Patent No.: US 8,938,271 B2
(45) Date of Patent: Jan. 20, 2015

(54) OPERATOR AND THIRD PARTY CLOUD SPECTRUM SERVICES FOR EFFICIENT SPECTRUM USAGE

(75) Inventors: Srikathyayani Srikanteswara, Portland, OR (US); Carlos Cordeiro, Portland, OR (US); Reza Arefi, Great Falls, VA (US); Geoff O. Weaver, Portland, OR (US); David M. Horne, Chandler, AZ (US); Takashi Shono, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 13/538,192

(22) Filed: Jun. 29, 2012

(65) Prior Publication Data

US 2013/0273953 A1 Oct. 17, 2013

Related U.S. Application Data

(60) Provisional application No. 61/603,261, filed on Apr. 11, 2012.

(51) Int. Cl.
*H04W 72/04* (2009.01)
*H04W 16/14* (2009.01)

(52) U.S. Cl.
CPC .......... *H04W 16/14* (2013.01); *H04W 72/0486* (2013.01)
USPC ........... 455/509; 455/514; 455/510; 455/450; 706/12

(58) Field of Classification Search
CPC ..... H04W 16/14; H04W 16/18; H04W 28/00; H04W 28/02; H04W 28/16; H04W 72/00; H04W 28/005; H04W 28/04; H04W 28/12

USPC .......... 455/509, 552.1, 452.1, 454, 406, 450, 455/418, 411, 409, 500, 67.11, 501, 90.2; 706/12; 705/37, 1, 7; 370/329, 328, 370/252, 338

See application file for complete search history.

(56) References Cited

U.S. PATENT DOCUMENTS

| | | | |
|---|---|---|---|
| 2006/0143111 A1* | 6/2006 | Mylet | 705/37 |
| 2007/0281710 A1* | 12/2007 | Bai et al. | 455/452.1 |
| 2008/0221951 A1* | 9/2008 | Stanforth et al. | 705/7 |
| 2008/0222019 A1* | 9/2008 | Stanforth et al. | 705/37 |
| 2008/0222020 A1* | 9/2008 | Stanforth et al. | 705/37 |
| 2008/0222021 A1* | 9/2008 | Stanforth et al. | 705/37 |
| 2009/0209265 A1* | 8/2009 | Kwon et al. | 455/454 |
| 2011/0055070 A1* | 3/2011 | Stanforth et al. | 705/37 |
| 2011/0231302 A1* | 9/2011 | Stanforth et al. | 705/37 |

(Continued)

*Primary Examiner* — Tan Trinh
(74) *Attorney, Agent, or Firm* — Ellis B. Ramirez; Prass LLP (57) ABSTRACT

A cloud spectrum manager (CSM) for managing the sharing of spectrum among multiple operators in a distributed computing environment. The cloud spectrum manager comprises an allocation service component which applies a resource allocation policy to determine whether the requested spectrum from an operator may be allocated. The allocation of spectrum allows the operator to get spectrum from the CSM at wholesale prices and then the operator manages the rented spectrum with its associated client devices. The operator manages the rented spectrum, perform their own analytics & optimization and offer spectrum services to the clients. The demands on the CSM are alleviated since it can manage spectrum at whole sale quantities and leave the finer grain device to device management to the operator.

20 Claims, 5 Drawing Sheets

(56) References Cited

U.S. PATENT DOCUMENTS

| | | | |
|---|---|---|---|
| 2011/0280194 A1* | 11/2011 | Schmidt et al. | 370/329 |
| 2011/0286401 A1* | 11/2011 | Wijting et al. | 370/329 |
| 2012/0142382 A1* | 6/2012 | Stanforth et al. | 455/500 |
| 2013/0196677 A1* | 8/2013 | Smith et al. | 455/452.1 |
| 2013/0273958 A1* | 10/2013 | Srikanteswara et al. | 455/514 |
| 2013/0275346 A1* | 10/2013 | Srikanteswara et al. | 706/12 |
| 2014/0051467 A1* | 2/2014 | Tan et al. | 455/501 |

\* cited by examiner

OPERATOR AND THIRD PARTY CLOUD SPECTRUM SERVICES FOR EFFICIENT SPECTRUM USAGE

This application claims priority to U.S. Provisional Application No. 61/603,261 entitled "INTELLIGENT SPECTRUM ALLOCATION BASED ON USER BEHAVIOR PATTERNS FOR EFFICIENT SPECTRUM USAGE," filed Feb. 25, 2012, the entire disclosure of which is incorporated herein by reference in its entirety.

BACKGROUND

1. Field of the Disclosed Embodiments

The present invention relates generally to wireless communications and more particularly to an approach for policy-driven spectrum allocation and sharing of multiple workloads in a distributed computing environment.

2. Introduction

Service providers and device manufacturers (e.g., wireless, cellular, etc.) are continually challenged to deliver value and convenience to consumers by, for example, providing compelling and reliable network services. Spectrum consumers like to get the data anytime and anywhere—that is have reliable service. However, with data explosion that becomes harder to achieve for operators. Numerous organizations have forecast significant mobile broadband traffic growth over the coming 5-10 years worldwide. On average, those forecasts approach 80% compound annual growth rate. This high traffic growth leads to the conclusion that spectrum (current and planned) targeted for exclusive licensing by mobile broadband carriers could be exhausted before the end of the decade. On the other hand, in spite of the potential spectrum scarcity problem, spectrum utilization measurements in most countries, worldwide, have shown that there is a large amount of underutilized spectrum in the 300 MHz to 6 GHz range. Industry and regulatory agencies are aware of these facts and issues, and are thereby trying to adopt more flexible and dynamic regulatory framework to enable spectrum sharing or access, which is called Dynamic Spectrum Sharing (DSS) and Dynamic Spectrum Access (DSA), respectively. DSS and DSA may enable a secondary user or spectrum holder in need of spectrum availability to use spectrum assigned to, or owned by, a primary user or spectrum holder without any harmful interference.

Cloud Spectrum Services (CSS) is a framework for Dynamic Spectrum Sharing (DSS) and Dynamic Spectrum Access (DSA) using the cloud for spectrum management that provides optimum spectrum allocation through dynamic spectrum rentals. At the heart of the CSS framework there is a CSS database and a broker that manages and optimizes the allocation based on various inputs like device capability, base station capability, spectrum availability and user needs, user movement and the like.

SOME EXAMPLE EMBODIMENTS

Therefore, there is a need for an approach for managing dynamic sharing of available spectrum services. In these embodiments a distributed computing environment is proposed where operator spectrum managers as well as a cloud spectrum broker perform the analytics needed to optimize the spectrum allocations.

According to one embodiment, a method to distributedly allocate spectrum for wireless communications, comprising maintaining a cloud spectrum broker database of spectrum that have been offered by primary spectrum holders advertising their spectrum for rent, the cloud spectrum broker database operable to identify portions of the offered spectrum that have been allocated to an alternate spectrum holder and to identify the remainder of the offered spectrum as unallocated spectrum, wherein the offered spectrum changes dynamically over time as new spectrum offers become available from primary spectrum holders, as spectrum offers elapse, and as spectrum availability from the primary spectrum holders changes; maintaining an operator database operable to store information associated with at least one spectrum asset, wherein the stored information includes allocated spectrum from the cloud spectrum broker database of advertised spectrum for rent, wherein the operator database is further operable to apportion the advertised spectrum for rent in response to a request for spectrum from a user.

According to another embodiment, a non-transitory machine-accessible medium that provides instructions, which when accessed, cause a machine to perform operations comprising maintaining a cloud spectrum broker database of spectrum that have been offered by primary spectrum holders advertising their spectrum for rent, the cloud spectrum broker database operable to identify portions of the offered spectrum that have been allocated to an alternate spectrum holder and to identify the remainder of the offered spectrum as unallocated spectrum, wherein the offered spectrum changes dynamically over time as new spectrum offers become available from primary spectrum holders, as spectrum offers elapse, and as spectrum availability from the primary spectrum holders changes; maintaining an operator database operable to store information associated with at least one spectrum asset, wherein the stored information includes allocated spectrum from the cloud spectrum broker database of advertised spectrum for rent, wherein the operator database is further operable to apportion the advertised spectrum for rent in response to a request for spectrum from a user; wherein the user is one or more content provider, client device, operator of a fixed network, base station, cluster of client devices, or a combination thereof.

According to another embodiment, a cloud spectrum broker to pooled spectrum resources in a distributed computing environment in response to spectrum requests from a plurality of operator spectrum managers, the cloud spectrum broker comprising an allocation service component for determining the availability of requested spectrum and for allocating spectrum resources, in accordance with a spectrum allocation policy.

In yet another embodiment an operator spectrum manager to apportion spectrum allocated by a centralized broker for spectrum service holders comprising at least one processor; and at least one memory including computer program code for one or more programs, the at least one memory and the computer program code configured to, with the at least one processor, cause the apparatus to perform at least the following, cause, at least in part, information corresponding to one or more available spectrum services provided by one or more spectrum service holders to be stored in an operator spectrum database, the information comprising one or more spectrum sharing criteria respectively associated with the one or more available spectrum services, the one or more spectrum sharing criteria being provided by the one or more spectrum service holders through a cloud spectrum broker; process a request from a user for spectrum sharing to cause, at least in part, a determination to share one or more of the one or more available spectrum services with a source of the request for spectrum sharing based, at least in part, on a matching of the one or more spectrum sharing criteria stored in the operator spectrum database and one or more service criteria associated with the source of the request for spectrum sharing; and cause, at least in part, one or more of the one or more available spectrum services to be allocated to the source of the request for spectrum sharing based, at least in part, on a request from a user for spectrum.

Exemplary embodiments are described herein. It is envisioned, however, that any system that incorporates features of any apparatus, method and/or system described herein are encompassed by the scope and spirit of the exemplary embodiments.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "spectrum asset" is a right to use, usually in a specific geographic area, a range of electromagnetic radiation, from the highest frequency to the lowest. The spectrum encompasses everything from X-rays and gamma rays to visible light and radio waves. Additionally, the spectrum asset can be reduced to a set of time slots selected from a group consisting of hours, days, time blocks, minutes, and seconds or to a frequency range that is also reducible to a set of time slots.

The term "Cloud Spectrum Services (CSS)" is used herein to refer to a dynamic spectrum rental scheme that uses a cloud-based database and optimization engine to allocate available spectrum to client devices.

The term "Multi-mode device (MMD)" is used herein to primarily refer to a user equipment (UE) or client device such as a wireless device to transmit and/or receive data to/from a fixed network infrastructure, and includes for example a mobile device, tablet, computing device, TV sets, hand held (HH) device. An MMD could also be capable of directly using spectrum resources assigned by a Cloud Spectrum Broker CSB. An MMD can engage in wired or wireless communication with other devices.

As used herein the terms "lease" and "rent" are synonymous.

The term "Primary Spectrum Holder (PSH)" in the context of a cloud spectrum services (CSS) transaction, is a spectrum owner with rights conveyed by a regulatory authority to a portion of the radio spectrum that will be dynamically managed by a CSB and reallocated for temporary use to MMDs and/or Alternate Spectrum Holders (ASHs). Examples include TV broadcasters, cellular operators, and government agencies (military, public safety, organizations, and the like).

The term "Alternate Spectrum Holder (ASH)" as used herein is any entity which provides MMDs with access to a fixed network infrastructure. Examples include cellular operators and government agencies. In Cloud Spectrum Services (CSS) an ASH is a user that can request spectrum from a cloud spectrum broker.

The term "Cloud Spectrum Service Database (CSSD)" is used herein to refer to a device to Store data that are used by a CSB to dynamically manage the spectrum asset such as a radio spectrum resource, i.e., spectrum availability at a given time in a given location. The CSD can be deployed by a third party or as part of an ASH or PSH network.

The term "Content Provider (CP)" is used herein to refer to Content providers such as ESPN, Netflix, Hulu, Disney and Amazon. A CP may establish service agreements directly with MMDs and uses the services of a CSB to ensure reliable delivery of content to MMDs across any communication infrastructure such as wireless media. In Cloud Spectrum Services (CSS) a CP is a user that can request spectrum from a cloud spectrum broker.

The term "Cloud Spectrum Broker (CSB)" refers to the entity, such as a CSS management platform, responsible for managing CSS transactions and for optimizing the use of the spectrum asset like a radio spectrum resource across a geographical area on the basis of parameters such as PSH offerings, ASH requirements and requests, MMD capabilities and requests, CP offerings and requirements, and application requirements.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "wireless device" as used herein includes, for example, a device capable of wireless communication, a communication device capable of wireless communication, a mobile terminal, a communication station capable of wireless communication, a portable or non-portable device capable of wireless communication, mobile terminal, or the like. In some embodiments, a wireless device may be or may include a peripheral device that is integrated with a computer, or a peripheral device that is attached to a computer. In some embodiments, the term "wireless device" may optionally include a wireless service.

As used herein, the term "network" is used in its broadest sense to mean any system capable of passing communications from one entity to another. Thus, for example, a network can be, but is not limited to, a wide area network, a WiFi network, a cellular network, and/or any combination thereof.

Figure 1:
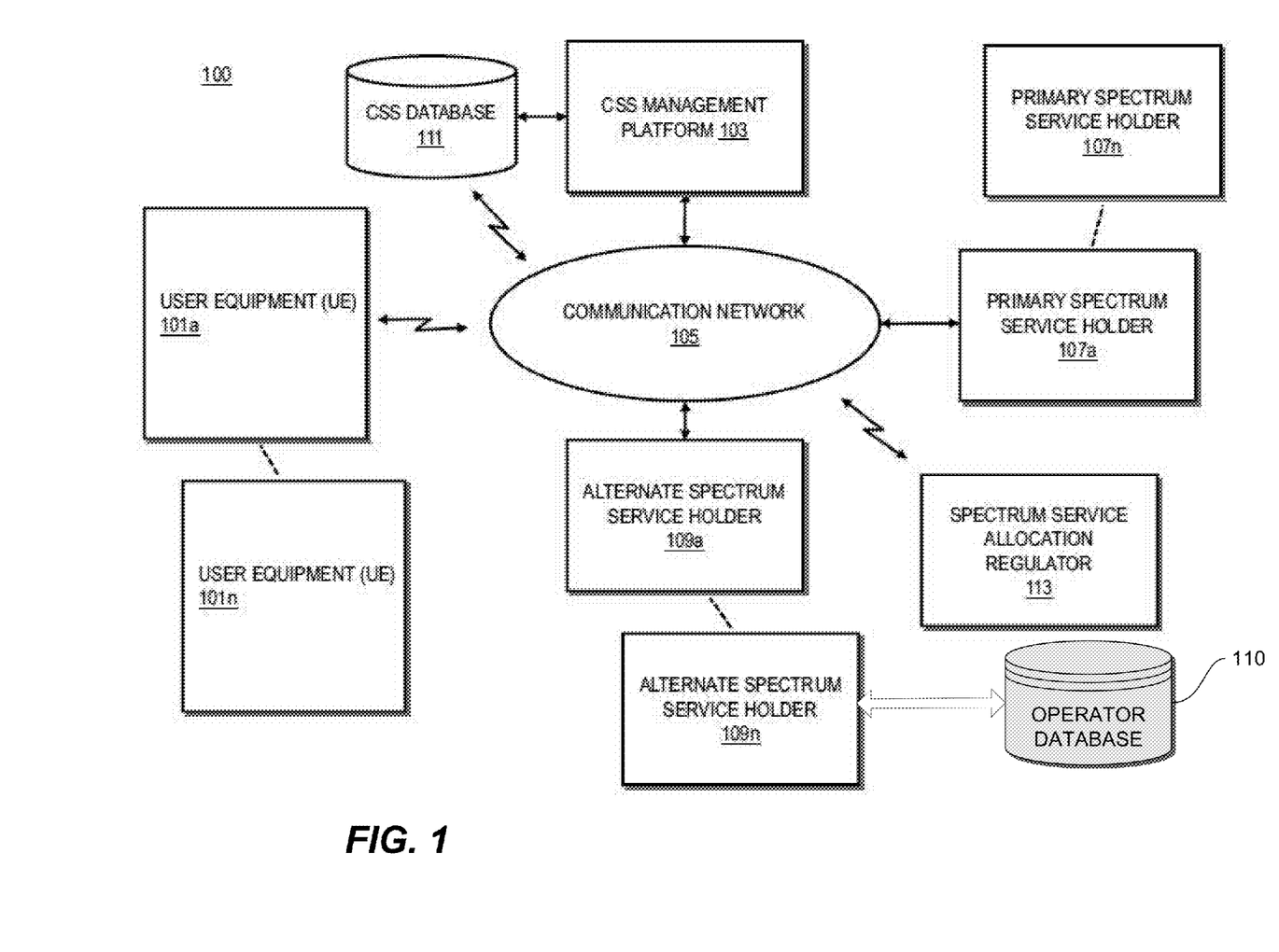
FIG. 1 is a diagram of a system capable of managing dynamic sharing of available spectrum services, according to one embodiment.

FIG. 1 is a diagram of a system 100 capable of managing dynamic sharing of available spectrum services, according to one embodiment. System 100 is capable of managing dynamic sharing of available spectrum services. For instance, the system 100 addresses the need for interfaces and protocols that enable communications among entities such as primary spectrum holders, alternate spectrum holders, spectrum brokers or management services, and/or regulatory agencies to facilitate dynamic sharing of available spectrum services by way of a cloud interface.

There are four major stakeholders in CSS: 1) a primary spectrum service holder having an exclusive right to use a specific spectrum service, 2) an alternate spectrum holder, e.g. a cellular or mobile broadband operator or service provider that may need to rent or borrow pieces of the spectrum owned or assigned to the primary spectrum service holder, 3) a regulatory agency that manages spectrum allocation and/or authorizes a renting or sharing deal between the primary spectrum service holder and the alternate spectrum service holder, and 4) a spectrum broker or management service that manages CSS transactions performed in the CSS cloud.

As shown in FIG. 1, the system 100 comprises user equipment (UE) 101a-101n (collectively referred to as UE 101) having connectivity to a CSS management platform 103, one or more primary spectrum service holders 107a-107n (collectively referred to as primary spectrum service holder 107), one or more alternate spectrum service holders 109a-109n (collectively referred to as alternate spectrum service holder 109), a CSS database 111, and one or more a spectrum service allocation regulators (collectively referred to and illustrated as spectrum service allocation regulator 113) via a communication network 105. While all of the UE 101, CSS management platform 103, primary spectrum service holder 107, alternate spectrum service holder 109, CSS database 111 and spectrum service regulator 113 are all illustrated as having connectivity to the communication network 105, each of these features may or may not have direct connectivity to one another, according to various embodiments and system architectures.

Figure 3:
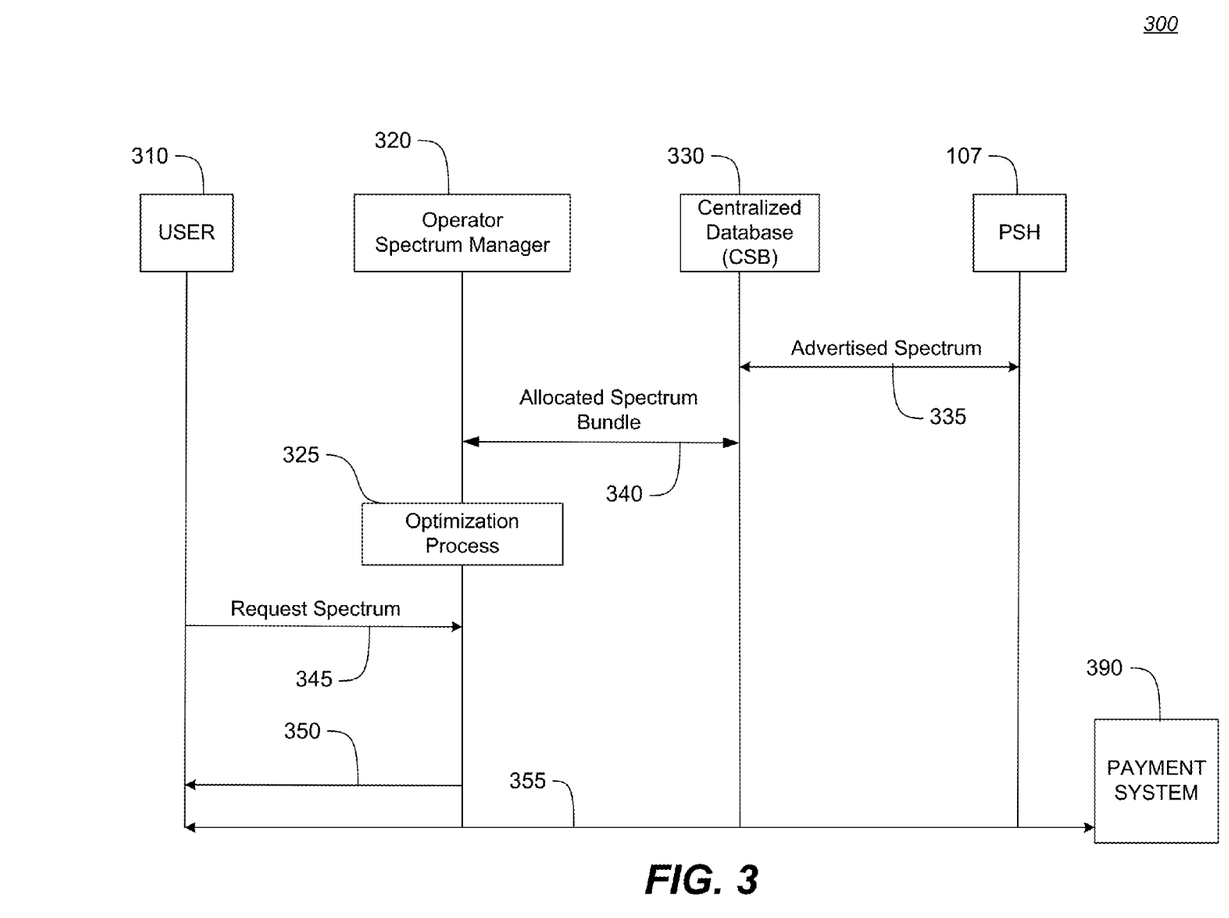
FIG. 3 provides an overview of the concept behind Cloud Spectrum Services (CSS) with distributed computing environment for dynamic spectrum rentals in accordance to an embodiment.

According to various embodiments, the CSS management platform 103 may be operated by a spectrum broker or management service and be operatively connected to, or include, the CSS database 111 like shown in FIG. 3. The CSS management platform 103 may also be configured to store various computational resources to perform CSS transactions in the CSS database 111 or in another memory associated with the CSS management platform 103.

According to various embodiments, the infrastructure of the alternate spectrum service holder 109 may be a radio access network (RAN) and/or a core network that has a capability to use various available spectrum services provided by the primary spectrum service holder 107 as rental spectrum, for example. Additionally, the UE 101 may be a CSS-capable multi-mode device (MMD), for example, capable of using various available spectrum services provided by the primary spectrum service holder 107.

In one or more embodiments, there may be any combination of one or more of the following four logical interfaces. For example, a first interface is defined between the primary spectrum service holder 107 and the CSS database 111. A second interface is defined between the alternate spectrum service holder 109 and the CSS management platform 103. A third interface is defined between the CSS management platform 103 and the CSS database 111. A fourth interface is defined between the primary spectrum service holder 107 and CSS management platform 103.

According to various embodiments, depending on CSS architecture, there may also, or alternatively, be other logical interfaces defined between the CSS management platform 103 and the UE 101, and/or the spectrum service allocation regulator 113. Or, the spectrum service allocation regulator may directly interface with the primary spectrum service holder 107.

In one or more embodiments, the primary spectrum service holder 107 provides the CSS management platform 103 and/or the CSS database 111 directly or by way of the CSS management platform 103 information, for instance, regarding which spectrum services such as radio resources are available for a particular period of time on a dynamic basis. The information regarding available spectrum services provided by the primary spectrum service holder 107 is accordingly stored in the CSS database 111.

According to various embodiments, the alternate spectrum service holder 109 or the UE 101 provides the CSS management platform 103 via an interface with one or more spectrum sharing requests regarding spectrum renting. For example, if the alternate spectrum service holder 109 or the UE 101 determines that additional spectrum services are needed beyond those currently available to the alternate spectrum service holder 109 or the UE 101 or estimated as being available in the future to the alternate spectrum service holder 109 or the UE 101, the alternate spectrum service holder 109 or the UE 101 makes a request for spectrum sharing that is sent to the CSS management platform 103 so that a need for current or future spectrum services may be satisfied.

Additionally, an operator database 110 is shown coupled to or residing at each or in one of the alternate spectrum service holder. The operator database 110 is capable of performing the same functions as CSS database 111. Operator database 110 receives dynamic spectrum availability information from spectrum broker identifying the primary holder and spectrum asset descriptors such as time, bandwidth, terms of use, price, and location. The availability information may be formatted to any suitable database structure and may be stored by a memory. A tabular form of the spectrum availability information is shown as table 126. The table 126 lists the primary spectrum holder 127 and the spectrum asset descriptors 128. In addition to collecting and organizing spectrum information, operator database 110 may maintain spectrum rules or inference engine to manage rules for spectrum use, including rules established by the primary spectrum holder 107, government regulations, or agreed upon rules established by the parties. In a tree structure CSS database 111 would be the root node (parent) while all the operator databases would be a branch or child of the database 111.

For example, the request for spectrum sharing may specify various service criteria or details regarding the request such as, but not limited to, one or more of a period of time during which the requested spectrum sharing is to occur, a price offering range for the requested spectrum sharing, a frequency range within which the requested spectrum sharing is allowed to occur, a performance requirement associated with the source of the request for spectrum sharing, and a spectrum service holder with which the requested spectrum sharing is allowed to occur.

The primary spectrum service holder 107, along with the information regarding which spectrum services are available, may indicate various spectrum sharing criteria to CSS management platform 103 regarding renting conditions including, but not limited to, an asking price for sharing an available spectrum service, a performance data of the available spectrum service, a frequency range of the available spectrum service, and a spectrum sharing requestor with which the available spectrum service is allowed to be shared.

Based on a receipt of a request for spectrum service sharing, the CSS management platform 103 obtains information stored in the CSS database 111, and analyzes the alternate spectrum service holder 109's or the UE 101's requests for spectrum sharing, and may also consider any regulatory rules that are provided by the spectrum service allocation regulator 113 to cause an allocation of one or more available spectrum services to the alternate spectrum service holder 109 or the UE 101.

For example, the CSS management platform 103 may compare the various spectrum sharing criteria set by the primary spectrum service holder 107 with the service criteria provided by the alternate spectrum service holder 109 or the UE 101. Based on this comparison, the CSS management platform 103 may determine whether a particular available spectrum service should be shared with the requesting alternate spectrum service holder 109 or the UE 101. The determination to share the available spectrum service may be based, for example, on a matching between the spectrum sharing criteria stored in the CSS database 111 and the service criteria provided by the alternate spectrum service holder 109 or the UE 101. The matching may be based on an optimization routine associated with pairing the various spectrum sharing criteria and the various service criteria, for example. Then, based on the matching, a decision to share an available spectrum service stored in the CSS database 111 may be made and the available spectrum service may be allocated to the alternate spectrum service holder 109 or the UE 101.

For example, if a primary spectrum service holder 107 only wants to enable sharing/renting of its available spectrum services to certain competitor carriers at particular times, the CSS management platform 103 causes a decision to share available spectrum services to be made in accordance with that particular combination of spectrum sharing criteria. Or, for example, if a primary spectrum service holder 107 will only rent or share its available spectrum services for a particular minimum price, the CSS management platform 103 will only match an alternate spectrum service holder 109 or UE 101 that has a price offering that meets the asking price provided in the spectrum sharing criteria. According to various embodiments, the CSS management platform 103 may be configured to maximize the revenue produced by sharing available spectrum services. For example, if an alternate spectrum service holder 109 or a UE 101 provides service criteria including a price offering or a price range that exceeds the asking price for spectrum rental, the CSS management platform 103 will allocate the available spectrum services to the highest bidder (assuming multiple bidding alternate spectrum service holders 109 or UE 101's, for example) and/or, if there is only one bidding entity, will allocate the available spectrum service at the maximum of the offered range, rather than at the asking price which may be lower than the offered range.

In one or more embodiments, the various spectrum sharing criteria and/or the service criteria may be weighted such that certain criteria is more important than other criteria, so that the decision to share spectrum services may be based on a weighted matching. For instance, if a spectrum sharing criteria is set to be limited to a particular time has a weighting of "X", but a price point for spectrum sharing is set as "Y" which is more heavily weighted than X, and a particular price point offered by the alternate spectrum service holder 109 or the UE 101 causes the timing limit to be overridden, the CSS management platform 103 may cause a decision to share the available spectrum service based on the price offering even though the primary spectrum service holder 107 would normally not allow spectrum sharing during the time at which the request for sharing spectrum services is made or the time at which the spectrum sharing is to occur. In other words, if a primary spectrum service holder 107 does not want to share spectrum services with a competitor such as alternate spectrum service holder 109 or UE 101 during peak hours, the primary spectrum service holder 107 may do so if the price is right.

It should be noted that the above examples are merely exemplary regarding potential matching, alignment, weighting, optimization and/or reasoning for comparing and matching an alternate spectrum service holder 109 or UE 101 with an available spectrum service provided by primary spectrum service holder 107. Any type of data or criteria, combination, or weighting scheme for spectrum sharing and/or service criteria may be provided to the CSS management platform 103 for consideration when making a determination to share available spectrum services and when allocating available spectrum services to an alternate spectrum service holder 107 and/or a UE 101.

Additionally, the CSS management platform 103 may consider any regulatory rules provided by the spectrum service allocation regulator 113, or rules could be integrated into CSS database 111, when determining to share the available spectrum service with the requesting alternate spectrum service holder 109 or the UE 101. For example, any regulatory rules that govern allocation of spectrum services by way of rental, borrowing, sharing, etc. may be considered when the CSS management platform 103 optimizes the matching of spectrum sharing criteria and service criteria, or the CSS management platform 103 may apply the regulatory rules after a determination to share the available spectrum services is made and the regulatory rules are applied to approve or disapprove of the decision to share the available spectrum services and/or the allocation of the available spectrum services to the alternate spectrum service holder 109 or the UE 101.

In one or more embodiments, the CSS management platform 103 updates the CSS database 111 regarding the allocation of the available spectrum services to the alternate spectrum service holder 109 or the UE 101. The CSS management platform 103 may also advise the alternate spectrum service holder 109 or the UE 101 of a decision on their request for spectrum sharing by way of a notification message. The notification message may include specific details regarding the decision to share the available spectrum service and/or the allocation such as price paid, price to be paid, time for the allocation, frequency allocation, primary spectrum service holder details, etc.

The CSS management platform 103 may also report the allocation of the available spectrum service to the primary spectrum service holder 107 by way of a notification message. The notification message may include specific details regarding the decision to share the spectrum service and/or the allocation such as price paid, price to be paid, time for the allocation, frequency allocation, primary spectrum service holder details, etc.

By way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, CSS management platform 103, primary spectrum service holder 107, alternate spectrum service holder 109, and optionally CSS database 111 and spectrum service allocation regulator 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
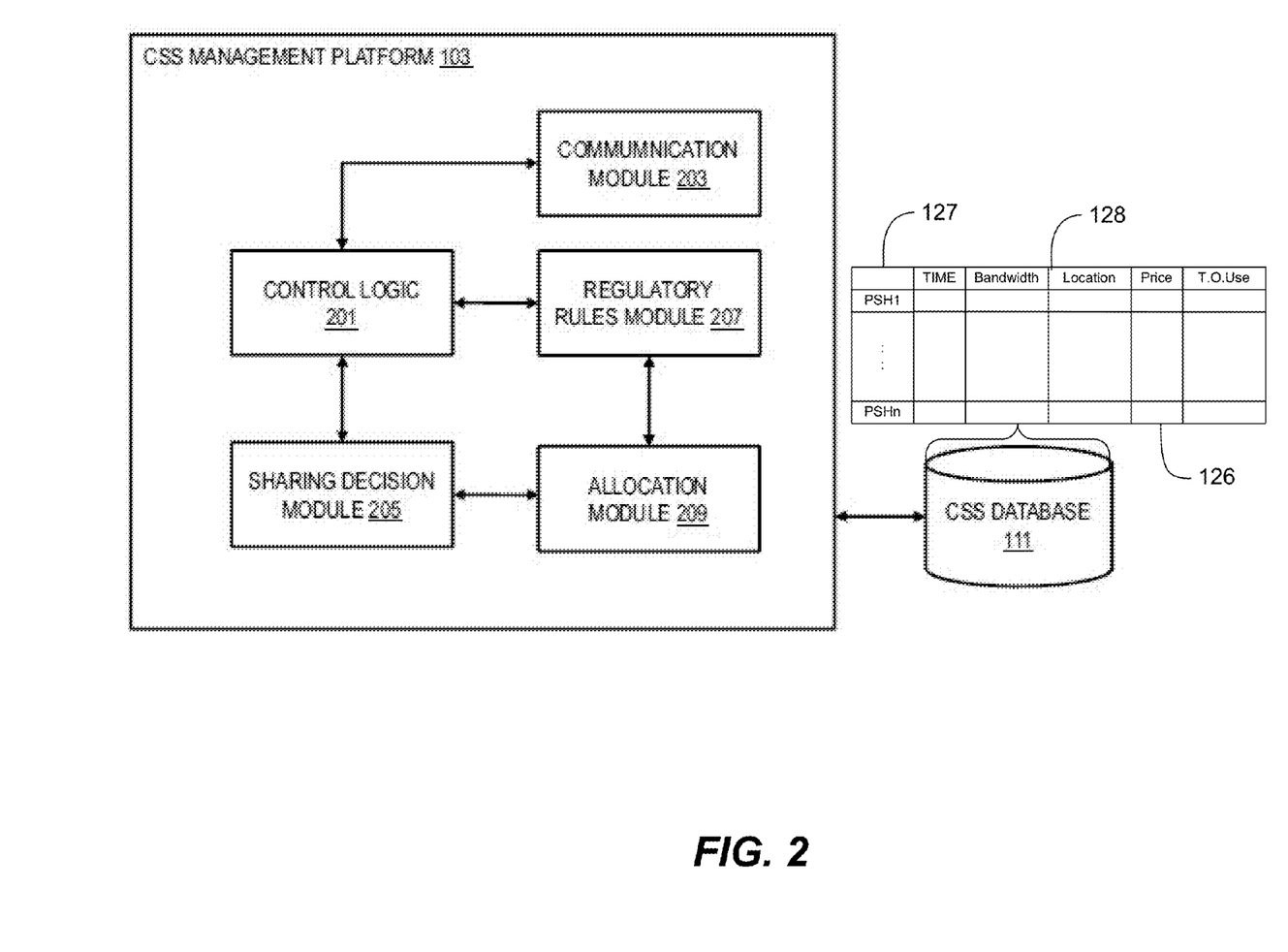
FIG. 2 is a diagram of the components of a cloud spectrum services management platform, according to one embodiment.

FIG. 2 is a diagram of the components of a cloud spectrum services management platform 103, according to one embodiment. FIG. 2 is a diagram of the components of CSS management platform 103, according to one embodiment. By way of example, the CSS management platform 103 includes one or more components for managing a dynamic sharing of available spectrum services. It is contemplated that the functions of these components may be combined in one or more components or performed by other components of equivalent functionality. In this embodiment, the CSS management platform 103 includes a communication module 203, a control logic 201, a sharing decision module 205, a regulatory rules module 207, an allocation module 209, and optionally the CSS database 111, discussed above.

According to various embodiments, the CSS management platform 103 receives information regarding one or more available spectrum services provided by the primary spectrum service holder 107 by way of the communication module 203. The control logic 201 causes the information regarding the one or more available spectrum services to be stored in the CSS database 111. A request for spectrum sharing may be received by the communication module 203. Upon receipt of the request for spectrum sharing, the control logic 201 instructs the sharing decision module 205 to assess any information associated with the request for spectrum sharing such as service criteria discussed above and/or the source of the request for spectrum sharing such as alternate spectrum service holder 109 or UE 101. The sharing decision module 205 accordingly compares the information associated with the request for spectrum sharing with any information associated with the available spectrum services stored in the CSS database 111 such as, but not limited to, any spectrum sharing criteria and/or any regulatory rules managed by the regulatory rules module 207 to determine to share one or more of the available spectrum services with the source of the request for spectrum sharing.

As discussed above, the decision to share spectrum services may be made inclusive of any available regulatory rules or be made before any regulatory rules are applied to verify a decision to share the available spectrum services. Upon making a decision to share one or more available spectrum services, the control logic 203 causes the allocation module 209 to facilitate sharing of the available spectrum services by allocating one or more available spectrum services to the source of the request for spectrum sharing, i.e. the alternate spectrum service holder 107 or the UE 101.

Upon allocating the available spectrum services to the source of the request for spectrum sharing, the allocation module 209 notifies one or more of the primary spectrum service holder 107 and the alternate spectrum service holder 109 or the UE 101 that the allocation has occurred and may also indicate various details related to the decision to share the one or more available spectrum services such as price, time, provider, etc. by way of the communication module 201. Additionally, the allocation module 209 causes the CSS database 111 to be updated to reflect the allocated spectrum services. CSS database 111 receives dynamic spectrum availability information from the PSH identifying the primary holder and spectrum asset descriptors such as time, bandwidth, terms of use, price, and location. The availability information may be formatted to any suitable database structure and may be stored by a memory. A tabular form of the spectrum availability information is shown as table 126. The table 126 lists the primary spectrum holder 127 and the spectrum asset descriptors 128.

FIG. 3 provides an overview 300 of the concept behind Cloud Spectrum Services (CSS) with distributed computing environment for dynamic spectrum rentals in accordance to an embodiment. The overview shows the interaction between a user 310, a broker through a centralized database (CSB) 330, operator spectrum manager 320, a primary spectrum holder 107, and an optional payment system 390. In the illustrated scenario a primary spectrum holder 107 may have available spectrum that it may wish to advertise for rent. The PSH can upload this information as shown by data flow 335 directly to centralized database 330 like cloud spectrum broker. As noted earlier the functions of the broker and the centralized database can be combined into a single entity such as CSS management platform 103. In this way the centralized database 330 is populated by PSHs advertising their spectrum for rent. Information provided by a PSH can include time, bandwidth, location, and term of use. All PSHs advertised their available spectrum by communication with the centralized database that is managed by a spectrum broker as outlined in FIG. 1. The broker may allocate the advertised spectrum to a plurality or a single operator spectrum manger 320 in conformance with a spectrum allocation policy like equally apportioning the spectrum as it becomes available. In the alternative the operators can be permitted to request a desired spectrum so it can perform their own analytics & optimization as shown by process 325 and offer spectrum services to the users such as client devices. Whether the spectrum is demanded or allocated to the operator by the broker a data flow 340 between the device is shown for communicating such as allocated spectrum bundle.

Spectrum users are often interested in obtaining access to spectrum for a particular application, such as enterprise applications, two-way communications, point-to-point microwave transmissions, point-to-multipoint communications, cellular communications, mobile broadband communications, and so forth. It will be appreciated that this list is in no way exhaustive of the possible communication applications of potential users. An operator spectrum manager can request an allocation of spectrum as shown in data flow 340.

A user 310 requesting spectrum 345 for rent would communicate with the operator acting as a broker and provides the operator with at least one time, bandwidth, location, and term of use. Additionally, through specialized messaging the operator is capable of initiating or placing advertised spectrum with a subset of users. In some instances, the user need not specify the amount of bandwidth that the user is seeking, but this information can be specified if known to the user. The operator spectrum manager (operator) 320 takes the request of user 310 and formulates a query that is sent to an internal database shown in FIG. 1 as operator database 110 for processing. It is noted that query 345 can also be formulated by the operator to forecast or predict future spectrum needs by the user. Once the user's needs are interpreted and the availability spectrum for rent is interpreted, the operator database may apply algorithms to find a match between the user's spectrum need and the spectrum that is available or may be available from a primary spectrum holder as communicated by the spectrum broker. The result of the query which identifies the closest match to the request for spectrum is communicated back to the user 310 as shown by data flow 350. Instances where the operator request a forecast for future spectrum needs, the operator engages in negotiation with the spectrum broker to meet the anticipated need for spectrum. If the spectrum suggested by the operator is acceptable to the user, the user invokes 355 a compensation system 390 that may include a transaction database and may match advertised spectrum to payments to satisfy any monetary or non-monetary consideration that is owed based on the placement of a spectrum asset. The payment system may receive compensation information from the operator or from another source, such as the spectrum user 310 or a third party.

Figure 4:
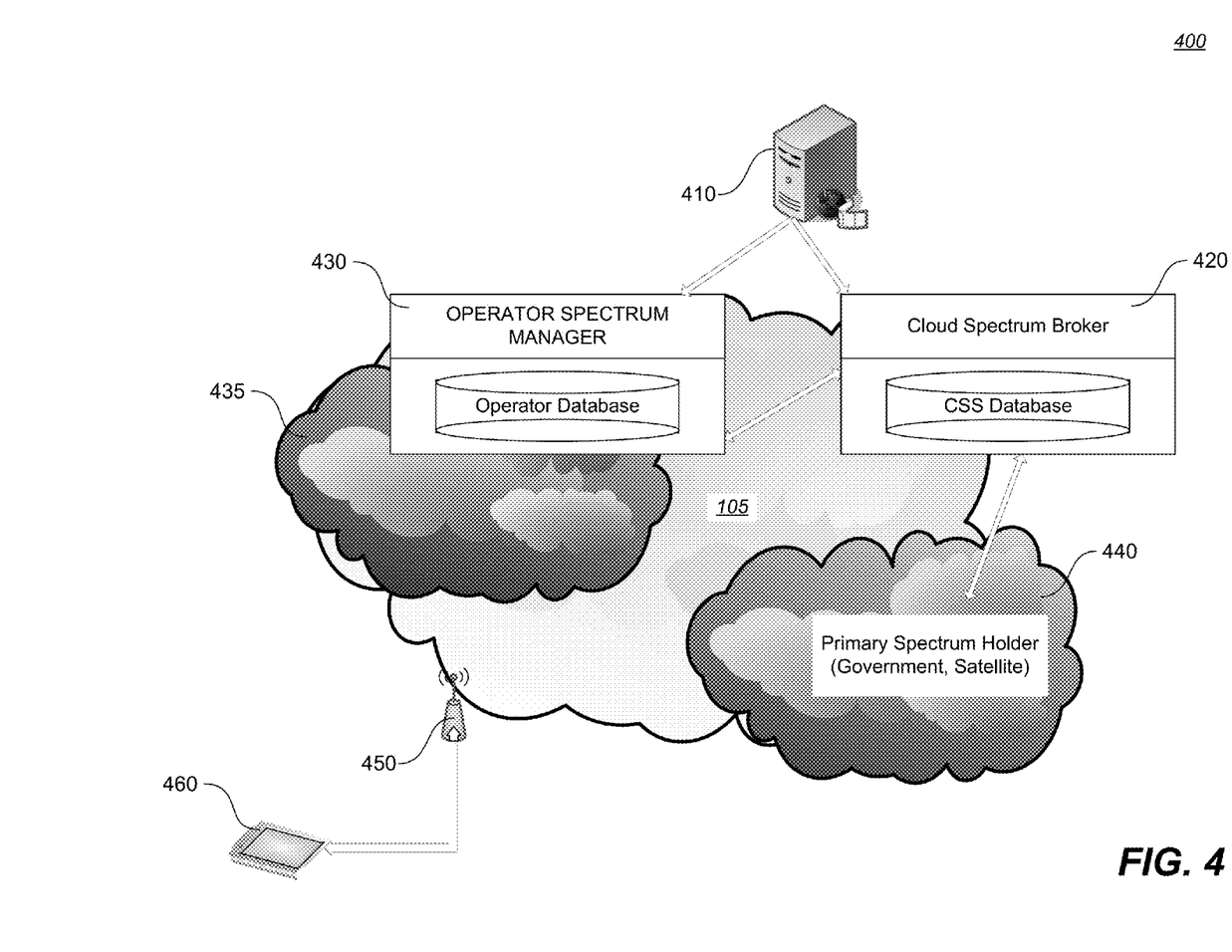
FIG. 4 is a block diagram of a distributed computing environment showing a content provider, operator database, cloud spectrum service database, and client device in accordance to an embodiment.

FIG. 4 is a block diagram of a distributed computing environment 400 showing a content provider, operator database, cloud spectrum service database, and client device in accordance to an embodiment. The distributed computing environment 400 provides flexible and optimal use of dynamic spectrum. Provides client devices 460 or base station 450 with superior service as spectrum requirements are met which allows the user to run all their applications whether it is video conferencing, streaming video or other internet or peer to peer applications such as video streaming from content provider 410. A client device through base station 450 is coupled through communication network 105 which allows data to be exchanged between base stations and which provides a gateway to other networks and content providers. The communication network is a collection of different spectrum ranges held by different entities or primary spectrum holder. As shown part of the communication network 105 comprises an operator network 435, alternate network 440 such as a government network or television station, and other networks. Exemplary candidate spectrum ranges include the 300 MHz to 400 MHz range held by the government, or the 698 MHz to 794 MHz range primarily used for television broadcasting. Each spectrum holder may wish to retain a portion of spectrum or a particular time or geography area for their continued use, and one or more wider portions of spectrum are made available for other services, such as wideband networking, video surveillance and so forth.

This allows the operator spectrum manger (operator) 430 to get spectrum from the third party like cloud spectrum broker (CSB) 420 at wholesale prices and then the operator manages the rented spectrum with its clients. This scheme is practical for two reasons: (i) The operators such as operator spectrum manager 430 can provide additional features and services. This scheme gives them control to manage the rented spectrum, perform their own analytics & optimization and offer spectrum services to the clients. (ii) The demands on the third party broker such as cloud spectrum broker 420 are alleviated since it can manage spectrum at whole sale quantities and leave the finer grain device to device management to the operator. In this scheme both the operator spectrum manager 430 as well as the third party broker have to perform the analytics needed to optimize the spectrum allocations. However the granularity of these optimizations will be different. The third party broker will perform the coarse grain optimizations for spectrum allocations, while the operator performs the fine grain spectrum optimizations. The operator's spectrum manager 430 will still need to perform bi-level optimizations within the spectrum it has rented to ensure all the users in a metropolitan area have the optimal allocation.

Figure 5:
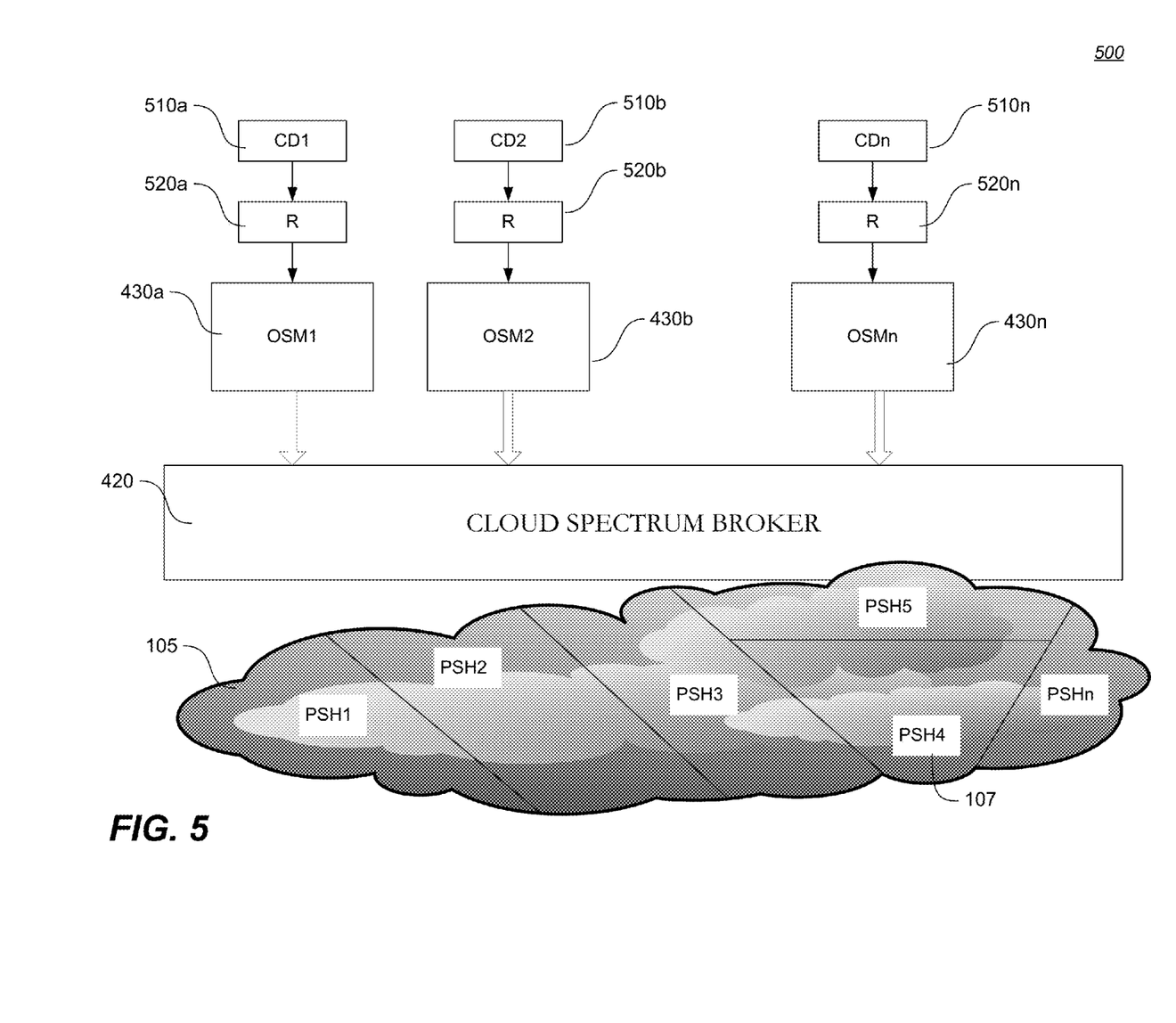
FIG. 5 is a block diagram of a distributed computing environment where allocation of spectrum is split between a cloud spectrum broker and an operator spectrum manager in accordance to an embodiment.

FIG. 5 is a block diagram 500 of a distributed computing environment where allocation of spectrum is split between a cloud spectrum broker and an operator spectrum manager in accordance to an embodiment. The block diagram 500 show a client device 510 (CD1 510$a$ . . . CDn 510$n$) initiating application request (R) or a request for additional spectrum 520$a$ . . . 520$b$ from an operator spectrum manager (OSM1 430$a$ . . . OSMn 430$n$). Each client device requires a particular amount of spectrum in order to run a communication application such as video streaming or the like. The operator network normally can provide the necessary spectrum or bandwidth to run the application; however there are instances were a higher spectrum is required or desired to achieve a target quality or resolution. The operator will then check its inventory to determine if the necessary spectrum is available for the client device. As a general matter the operator spectrum manger can acquire spectrum from a cloud spectrum broker 420. As noted earlier the communication network 105 is a collection of spectrums belonging or associated with at least one primary spectrum holder (PSH) 107. PSH can advertise their spectrum for rent with the cloud spectrum broker 420 which then can allocate to the operator based on some allocation policy. Each OSM translates the demand from the client device into a series of generic resource allocation or deallocation of spectrum.

By utilizing a single common cloud spectrum broker 420 which manages the allocation of resources across multiple operator spectrum managers (OSM) 430$a$, 430$b$ . . . 430$n$, the CSB functions are decoupled from the operator management functions. Consequently, the OSMs may operate autonomously of the CSB once they have been allocated sufficient spectrum to run the applications at the client devices. If the CSB has to be taken offline for reconfiguring or suffers downtime, the OSM may continue processing the applications for the allocated spectrum. One advantage of this is that it improves the availability and reliability of the overall system. It should be appreciated that the CSB may typically receive multiple requests for spectrum from multiple OSMs. In response to each spectrum request, the CSB applies the spectrum allocation policy to determine whether each request may be satisfied. The CSM must keep track of the amount of spectrum that is available, since these amounts will fluctuate as spectrum are allocated, de-allocated, and as new spectrum offers become available from primary spectrum holders, as spectrum offers elapse, and as spectrum availability from the primary spectrum holders changes.

In both the operator spectrum manger and the cloud spectrum broker, an allocation service component (not shown) in cooperation with a dynamic provisioning service component provide information regarding spectrum requests that have not been met and/or spectrum that are standing idle. The dynamic provisioning service component applies various algorithms in the form of repositioning policies to determine whether to take steps to modify the make-up of the existing pool of spectrum by replenishing or releasing spectrum. For example, the dynamic provisioning service component may analyze the information regarding unmet spectrum requests and/or idle spectrum to determine whether it should, where it is possible to do so, reconfigure some of the spectrum having an attribute that is not in demand, into resources having attributes for which there is unmet demand. The particular attributes may be communication infrastructure or hardware attributes (such as bandwidth, time, or geography), operating system attributes (such as operating system type, version, patch levels, runtime operating system parameters) or application attributes (i.e. whether certain software application packages have been installed). If a set of resources meets some attributes but not others, the allocation service component, especially at the operator level, may be called upon to identify suitable candidate resources for reconfiguration.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of an automated spectrum trading and the optimization of spectrum allocation have been described. Using the disclosed approach, efficient and productive use of spectrum may be made, while minimizing the procedural and transactional burdens on spectrum holders or spectrum users. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method to distributedly allocate spectrum for wireless communications, comprising:
   maintaining a cloud spectrum broker database of spectrum that have been offered by primary spectrum holders advertising their spectrum for rent, the cloud spectrum broker database operable to identify portions of the offered spectrum that have been allocated to an alternate spectrum holder and to identify the remainder of the offered spectrum as unallocated spectrum, wherein the offered spectrum changes dynamically over time as new spectrum offers become available from primary spectrum holders, as spectrum offers elapse, and as spectrum availability from the primary spectrum holders changes;
   maintaining an operator database operable to store information associated with at least one spectrum asset, wherein the stored information includes allocated spectrum from the cloud spectrum broker database of advertised spectrum for rent, wherein the operator database is further operable to apportion the advertised spectrum for rent in response to a request for spectrum from a user;
   wherein the operator database will check the stored information to determine if the request for spectrum is available for a client device before requesting spectrum from the cloud spectrum broker database;
   wherein an operator using the operator database can engage in negotiation with the spectrum broker database to meet an actual or future spectrum need for the user;
   wherein the operator spectrum manager uses the stored information associated with at least one spectrum asset to perform periodic optimizations to maximize spectrum utilization among wireless communication systems.

2. The method in accordance to claim 1, wherein the user is at least one of content provider, client device, operator of a fixed network, base station, or cluster of client devices.

3. The method in accordance to claim 2, wherein allocated spectrum information is at least one of time, bandwidth, price, location, terms of use conditions, or a combination thereof.

4. The method in accordance to claim 3, further comprising:
   maintaining an operator spectrum manager to match advertised spectrum for rent with a request for spectrum from a user.

5. The method in accordance to claim 4, wherein the operator spectrum manager is capable of receiving request for spectrum directly from the user.

6. The method in accordance to claim 5, wherein a content provider can negotiate with the spectrum broker database to meet an actual or future spectrum need for the client device.

7. The method in accordance to claim 6, wherein the advertised spectrum for rent and terms of use conditions are periodically advertised to the cloud spectrum broker database by the spectrum holder and wherein the cloud spectrum broker database is capable of reserving a set of advertised spectrum for selected alternate spectrum holders.

8. A non-transitory machine-accessible medium that provides instructions, which when accessed, cause a machine to perform operations comprising:
   maintaining a cloud spectrum broker database of spectrum that have been offered by primary spectrum holders advertising their spectrum for rent, the cloud spectrum broker database operable to identify portions of the offered spectrum that have been allocated to an alternate spectrum holder and to identify the remainder of the offered spectrum as unallocated spectrum, wherein the offered spectrum changes dynamically over time as new spectrum offers become available from primary spectrum holders, as spectrum offers elapse, and as spectrum availability from the primary spectrum holders changes;
   maintaining an operator database operable to store information associated with at least one spectrum asset, wherein the stored information includes allocated spectrum from the cloud spectrum broker database of advertised spectrum for rent, wherein the operator database is further operable to apportion the advertised spectrum for rent in response to a request for spectrum from a user;
   wherein the operator database will check the stored information to determine if the request for spectrum is available for a client device before requesting spectrum from the cloud spectrum broker database;
   wherein an operator using the operator database can engage in negotiation with the spectrum broker database to meet an actual or future spectrum need for the user;
   wherein the operator spectrum manager uses the stored information associated with at least one spectrum asset to perform periodic optimizations to maximize spectrum utilization among wireless communication systems;
   wherein the user is one or more content provider, client device, operator of a fixed network, base station, or cluster of client devices.

9. The non-transitory machine-accessible medium in accordance to claim 8, wherein allocated spectrum information is at least one of time, bandwidth, price, location, terms of use conditions, or a combination thereof.

10. The non-transitory machine-accessible medium in accordance to claim 9, further comprising said instructions causing said machine to perform operations further comprising maintaining an operator spectrum manager to match advertised spectrum for rent with a request for spectrum from a user; wherein the advertised spectrum for rent and terms of use conditions are periodically advertised to the cloud spectrum broker database by the spectrum holder and wherein the cloud spectrum broker database is capable of reserving a set of advertised spectrum for selected alternate spectrum holders.

11. A cloud spectrum broker to pooled spectrum resources in a distributed computing environment in response to spectrum requests from a plurality of operator spectrum managers, the cloud spectrum broker comprising:
   an allocation service component to determine the availability of requested spectrum and for allocating spectrum resources, in accordance with a spectrum allocation policy;
   wherein the operator spectrum manager will check stored information of allocated spectrum from allocation service component of advertised spectrum for rent to determine if the request for spectrum is available for a client device before requesting spectrum from the cloud spectrum broker database;
wherein an operator spectrum manager can engage in negotiation with the spectrum broker to meet an actual or future spectrum need for a user;
wherein the operator spectrum manager uses the stored information associated with at least one spectrum asset to perform periodic optimizations to maximize spectrum utilization among wireless communication systems;
wherein a content provider can negotiate with the spectrum broker to meet an actual or future spectrum need for the client device.

12. The cloud spectrum broker in accordance to claim 11, further comprising:
a cloud spectrum broker database of spectrum that have been offered by primary spectrum holders advertising their spectrum for rent, the cloud spectrum broker database operable to identify portions of the offered spectrum that have been allocated to an operator spectrum manager and to identify the remainder of the offered spectrum as unallocated spectrum, wherein the offered spectrum changes dynamically over time as new spectrum offers become available from primary spectrum holders, as spectrum offers elapse, and as spectrum availability from the primary spectrum holders changes.

13. The cloud spectrum broker in accordance to claim 12, an operator spectrum manager further comprising:
an operator database operable to store information associated with at least one spectrum asset, wherein the stored information includes allocated spectrum from the cloud spectrum broker database of advertised spectrum for rent, wherein the operator database is further operable to apportion the advertised spectrum for rent in response to a request for spectrum from a user;
wherein the user is one or more of a content provider, client device, operator of a fixed network, base station, cluster of client devices, or a combination thereof;
wherein allocated spectrum information is at least one of time, bandwidth, price, location, terms of use conditions, or a combination thereof.

14. The cloud spectrum broker in accordance to claim 13, wherein the operator spectrum manager is capable of receiving request for spectrum directly from the user.

15. The cloud spectrum broker in accordance to claim 14, wherein the advertised spectrum for rent and terms of use conditions are periodically advertised to the cloud spectrum broker database by the spectrum holder and wherein the cloud spectrum broker database is capable of reserving a set of advertised spectrum for selected operator spectrum managers.

16. An operator spectrum manager to apportion spectrum allocated by a centralized broker for spectrum service holders comprising:
at least one processor; and
at least one memory including computer program code for one or more programs,
the at least one memory and the computer program code configured to, with the at least one processor, cause the apparatus to perform at least the following,
cause, at least in part, information corresponding to one or more available spectrum services provided by one or more spectrum service holders to be stored in an operator spectrum database, the information comprising one or more spectrum sharing criteria respectively associated with the one or more available spectrum services, the one or more spectrum sharing criteria being provided by the one or more spectrum service holders through a cloud spectrum broker;
process a request from a user for spectrum sharing to cause, at least in part, a determination to share one or more of the one or more available spectrum services with a source of the request for spectrum sharing based, at least in part, on a matching of the one or more spectrum sharing criteria stored in the operator spectrum database and one or more service criteria associated with the source of the request for spectrum sharing; and
cause, at least in part, one or more of the one or more available spectrum services to be allocated to the source of the request for spectrum sharing based, at least in part, on a request from a user for spectrum;
wherein the operator spectrum manager will check stored information of allocated spectrum from the centralized broker of advertised spectrum for rent to determine if the request for spectrum is available for a client device before requesting spectrum from the cloud spectrum broker database;
wherein the operator spectrum manager can engage in negotiation with the centralized broker to meet an actual or future spectrum need for the user;
wherein the operator spectrum manager uses stored information associated with at least one spectrum asset to perform periodic optimizations to maximize spectrum utilization among wireless communication systems.

17. The operator spectrum manager in accordance to claim 16, wherein the user is one or more of a content provider, client device, operator of a fixed network, base station, cluster of client devices, or a combination thereof.

18. The operator spectrum manager in accordance to claim 17, wherein the information corresponding to one or more available spectrum services comprises at least one of time, bandwidth, price, location, terms of use conditions, or a combination thereof; wherein the operator spectrum database performs periodic optimizations to maximize spectrum utilization among wireless communication systems.

19. The operator spectrum manager in accordance to claim 18, wherein an advertise spectrum for rent and terms of use conditions are periodically advertised to the centralized broker by the spectrum service holders and wherein the centralized broker is capable of reserving a set of advertised spectrum for selected operator spectrum managers.

20. The operator spectrum manager in accordance to claim 19, wherein apportioning the one or more of the one or more available spectrum services is in response to knowledge information about a user request and a past behavior pattern of the user.

* * * * *